United States Patent [19]
Lyon

[11] Patent Number: 5,166,792
[45] Date of Patent: Nov. 24, 1992

[54] VIDEO SIGNAL PROCESSING AND VIDEO STORES

[75] Inventor: David Lyon, Farnham, England

[73] Assignee: Snell & Wilcox Limited, Waterlooville, United Kingdom

[21] Appl. No.: 668,509

[22] PCT Filed: Sep. 22, 1989

[86] PCT No.: PCT/GB89/01196
§ 371 Date: Mar. 25, 1991
§ 102(e) Date: Mar. 25, 1991

[87] PCT Pub. No.: WO90/03705
PCT Pub. Date: Apr. 5, 1990

[30] Foreign Application Priority Data
Sep. 23, 1988 [GB] United Kingdom ............. 8822415

[51] Int. Cl.⁵ ............................................. H04N 7/01
[52] U.S. Cl. ............................................ 358/140
[58] Field of Search ................... 358/140, 11, 312

[56] References Cited
U.S. PATENT DOCUMENTS

| | | | |
|---|---|---|---|
| 4,276,565 | 6/1981 | Dalton | 358/140 |
| 4,335,395 | 6/1982 | Clarke | 358/11 |
| 4,558,377 | 12/1985 | Collins | 358/312 |
| 4,698,698 | 10/1987 | Collins | 358/312 |

FOREIGN PATENT DOCUMENTS

| | | |
|---|---|---|
| 0003182 | 7/1979 | European Pat. Off. . |
| 2098021 | 11/1982 | United Kingdom . |
| 1599346 | 9/1991 | United Kingdom . |

*Primary Examiner*—Howard W. Britton
*Attorney, Agent, or Firm*—Wolf, Greenfield & Sacks

[57] ABSTRACT

Video signal processing apparatus, particularly for converting from one broadcast television standard to another, utilizes a plurality of field stores which are read cyclically. Information is written simultaneously into a number of field stores and accumulated over a number of input fields. Line interpolation is conducted before information is written to the field stores.

13 Claims, 3 Drawing Sheets

VIDEO SIGNAL PROCESSING AND VIDEO STORES

This invention relates to video stores and to methods of digital standards conversion and other video signal processing techniques utilising such stores.

In Europe, the main scanning standard for broadcast television signals uses 625 lines per picture and 50 fields per second. North America and Japan, however, use 525 lines per picture and approximately 60 fields per second. It can therefore be appreciated that a conversion process is necessary before programmes originating on one standard can be broadcast in countries using another standard. Whilst conversion could be achieved optically, digital electronic conversion techniques offer far better performance.

It will be understood that the digital conversion process requires lines in the output standard to be constructed by an interpolation procedure over a number of adjacent lines in the input standard. A similar interpolation procedure is required to construct fields.

In one approach adopted hitherto for electronics standards conversion, (see for example GB-A-1599346) line interpolation is conducted in an input stage with information from, say, three adjacent lines being utilised to construct a line at the position required for the output standard. The line information is loaded into a field store which is capable of asynchronous operation. Picture information may accordingly be read out of the video store at the field rate corresponding to the output standard. According to a suitable field interpolation algorithm, picture information in the video store is updated to a value which reflects both the current and preceding field values.

Because the video store is asynchronous, complicated control circuitry must be employed to regulate read and write operations. It has, moreover, been found that this manner of conversion, where line interpolation and field interpolation are carried out sequentially, is not the optimum, and significant picture artefacts can arise.

An alternative approach, as shown in EP-A 003 182, utilises a plurality of input field stores which are each divided into separately readable line blocks. Fields of the incoming video signal are loaded successively into the field stores with the lines of each field being loaded successively into the separate blocks of that field store. In this way, information from m fields (typically two) and n lines (typically four) can be made available simultaneously for a combined line and field interpolation process in the output stage. This is regarded theoretically as superior to sequential line and field interpolation. The memory structure required for this approach is, however, inconvenient and difficult to implement on high density storage devices. There is the further difficulty that since all interpolation is conducted in the output stage, it is not possible to perform those processing steps (such as VTR drop-out correction) which require information from separate lines in the input stage.

Appropriate arrangements of field stores can be used in video signal processing techniques other than standards conversion, examples of such further techniques being synchronization, noise reduction and —particularly in relation to video recorders —slow and fast motion. Reference is directed to GB 2 098 021A which discloses digital television apparatus having three field stores with reading and writing operations being rotated cyclically about the stores. Depending upon the rate of supply of a video signal to the field store arrangement, a choice is made whether to write information to one or two of the field stores and, similarly, whether to read from one or from two of the field stores. The content of any field store always corresponds with a single field of the input video signal except in the trivial case where the data associated with a particular pixel is detected as corrupt and the data associated with the same pixel in the preceding frame left undisturbed.

The described field store arrangement offers some advantages in accomodating slow and fast motion signals from a digital video tape recorder but is not suitable for the more demanding requirements of standards conversion or, indeed, a range of other video signal processing techniques.

It is an object of one aspect of the present invention to provide an improved method of video signal processing.

Accordingly, the present invention consists in one aspect in a method of processing an input video signal utilising at least n field stores, comprising writing information simultaneously to n−1 of the field stores and reading the stores cyclically to produce an output video signal, characterized in that differently weighted information corresponding with each field of the input signal is written simultaneously to the respective n−1 field stores and in that information is accumulated over a different m fields of the input video signal in the respective n field stores, where $n > m > 1$.

Advantageously, the information written to each of the field stores and corresponding with one line of the output video signal, is derived from a plurality of lines of the input video signal.

It will be appreciated that, in an application of the present invention to standards conversion, the individual field stores are accumulating over a number of input fields the information necessary to generate output fields by sequential reading of the field stores.

The invention will now be described by way of example with reference the accompanying drawings in which.

For the sake of clarity, the invention will initially be described by reference to a somewhat simplified example in which no line interpolation is carried out and field interlacing is ignored. Interpolation is to be conducted over two input fields only. Whilst such an arrangement is simple as compared with digital standards converters to be described hereafter, it will nonetheless find application in, for example, noise reduction techniques.

Figure 1:
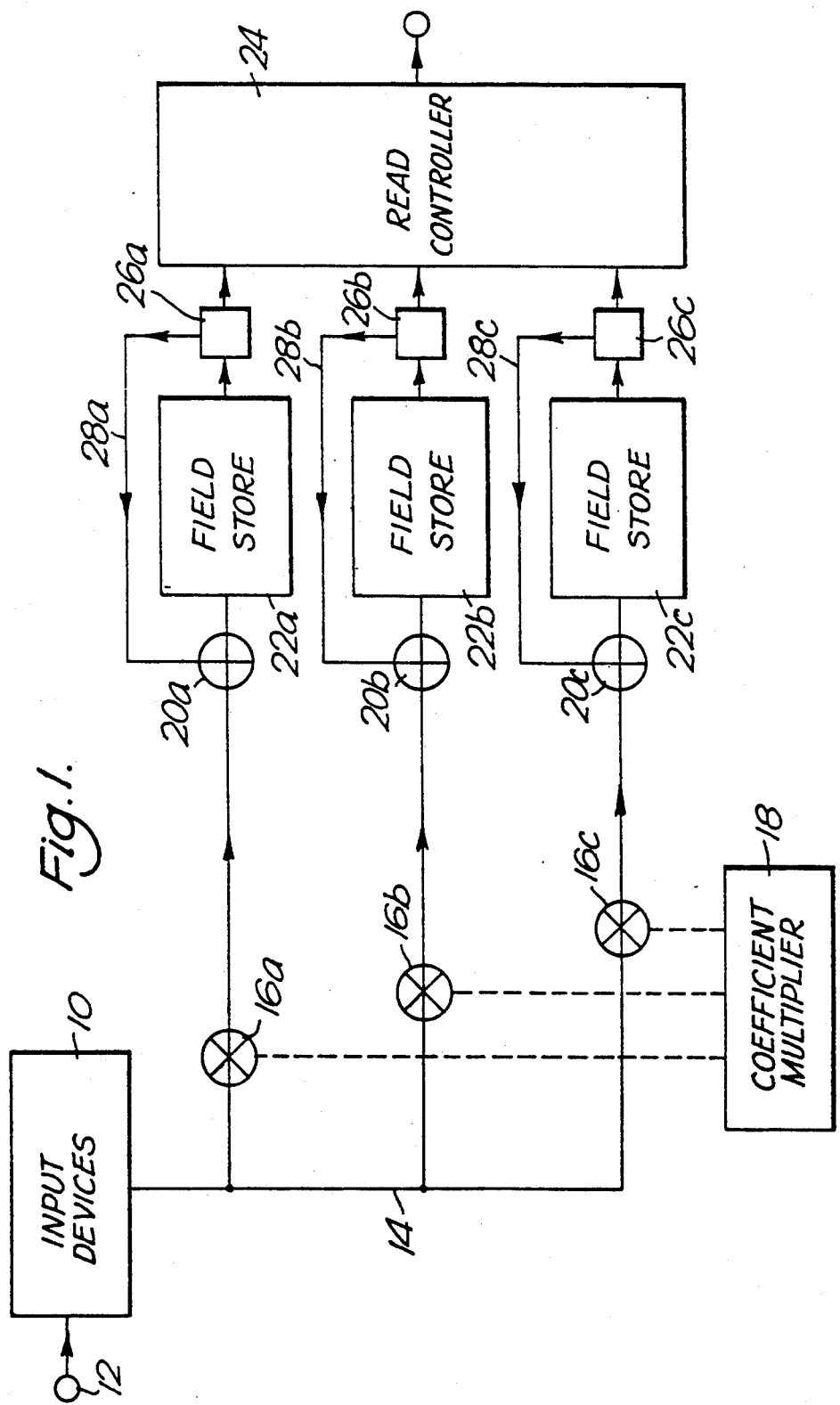
FIG. 1 is a block diagram illustrating one example of a method and apparatus according to the present invention.

Referring to FIG. 1, apparatus according to one embodiment of this invention comprises input means 10 adapted to receive an input video signal on line 12 and to provide on line 14 an appropriately scaled and time base corrected digital signal. Separate arrangements may be made for the luminence and chrominance elements of the video signal or, more likely, the input means 10 can be adapted to multiplex between these components.

The digital signal on line 14 is passed in parallel to each of three multipliers 16a, 16b and 16c. These are arranged under the control of a coefficient modifier 18 to apply to the digital signal a selected multiplication coefficient, the coefficient varying both between the multipliers and from field to field of the input video signal. Each multiplier 16a, 16b and 16c is connected with a respective adder 20a, 20b and 20c connected at the input of an associated field store 22a, 22b and 22c. The output of each field store is taken to a read controller 24 via an accumulation gate 26a, 26b and 26c. An accumulation loop 28a, 28b and 28c connects the accumulation gate 26 of each field store with the corresponding adder 20.

The operation of the described circuit can now be understood.

Consider the case in which the output fields F are to be generated from the fields F of the input video signal in accordance with:

$$F_j = pF_i + qF_{i+1}$$

During input field $F_i$, multiplier 16a is set through coefficient modifier 18 such that the value $pF_i$ is loaded into field store 22a with no accumulation. During input field $F_{i+1}$ coefficient modifier 16a is appropriately set to produce the value $qF_{i+1}$ which through the accumulation loop 28a is added to the existing content of field store 22a to produce $pF_i + qF_{i+1}$. During this same input field, multiplier 16b is set such that the value $pF_{i+1}$ is loaded without accumulation in field store 22b. During input field $F_{i+2}$, multiplier 16a is disabled with field store 22a being read through read controller 24 to produce output field $F_j = pF_i + qF_{i+1}$. Simultaneously, the value $qF_{i+2}$ is loaded in accumulation mode into field store 22b and the value $pF_{i+2}$ is loaded without accumulation into field store 22c. It will be appreciated that the information necessary to produce the next output field $F_{j+1}$ is being assembled in field store 22b and the process continues with the field stores being read cyclically.

By increasing the number of field stores, it can be assured that one field store is always in a position to be read, even if the output field rate increases. As will be recognised, reading can be conducted asynchronously. Nonetheless, the operation of each field store is straightforward and memory management is considerably simplified. An increase in field stores will also enable interpolation to be carried out over a greater number of input fields. In any practical situation, the number of field stores is dictated by first the number of input fields over which interpolation is to be conducted and, second, the relative field rates of the input and output video signals with the criterion being that a field store having passed through the appropriate number of input field accumulation steps should always be available for reading.

Figure 2:
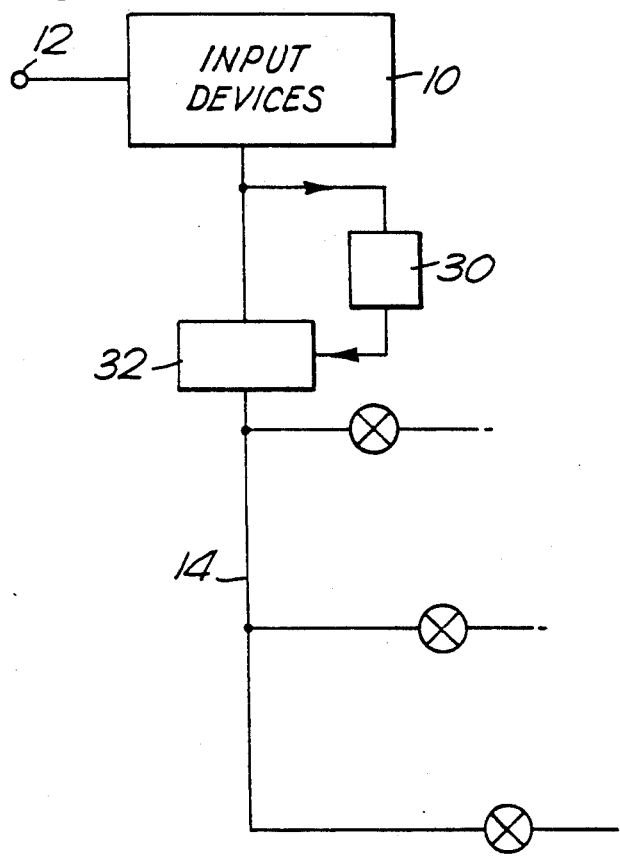
FIG. 2 illustrates a first modification to the apparatus of FIG. 1.

An important advantage of the described arrangement according to this invention is that the input video signal remains available for additional processing. Thus, for example, as illustrated schematically in FIG. 2, a line delay 30 and a drop-out corrector 32 can be introduced in the line 14, to enable the last line in the input video signal to be repeated in the case of data corruption.

Figure 3:
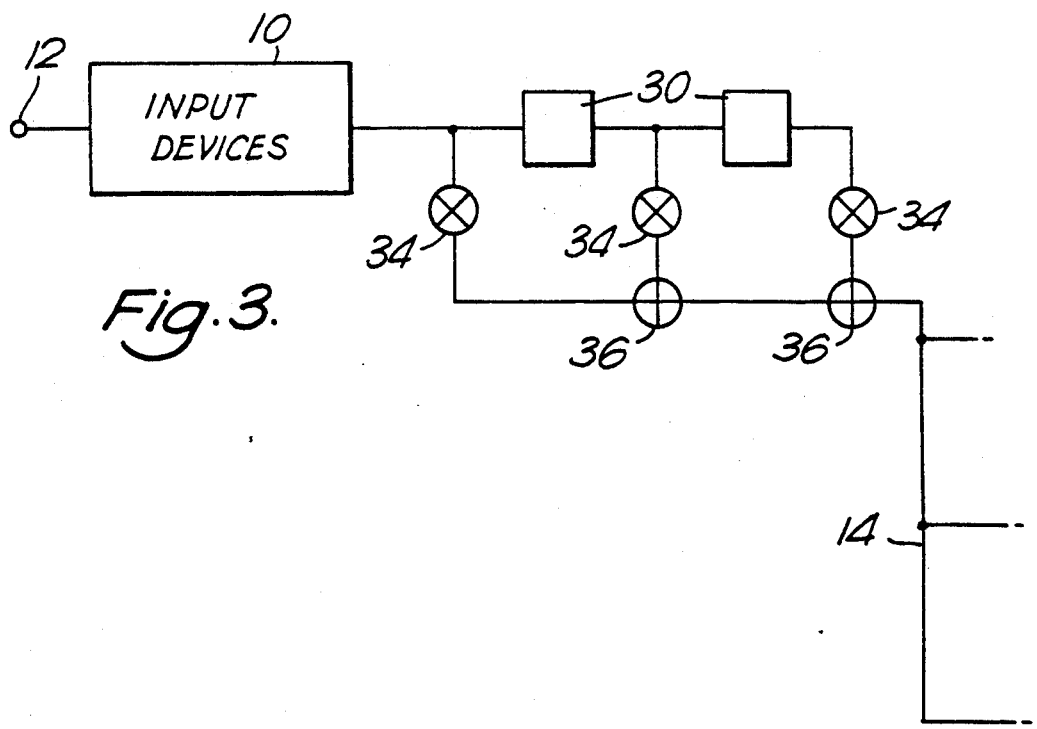
FIG. 3 illustrates a second modification to the apparatus of FIG. 1.

Perhaps more significantly, line interpolation can also be provided. Referring to FIG. 3, there is provided a line interpolator comprising two line delays 30 connected in series. Multipliers 34 are connected with the inputs and outputs of these line delays and the outputs of the multipliers are summed through adders 36. With the addition of such a line interpolator, the arrangement of FIG. 1 is able to function as a standards convertor. Field interpolation operates in the manner described above with each line written into any of the field stores 22 now not corresponding to a single line of the input video signal but being derived from a plurality of lines of the input video signal to produce the desired number of lines in the output video signal.

Figure 4:
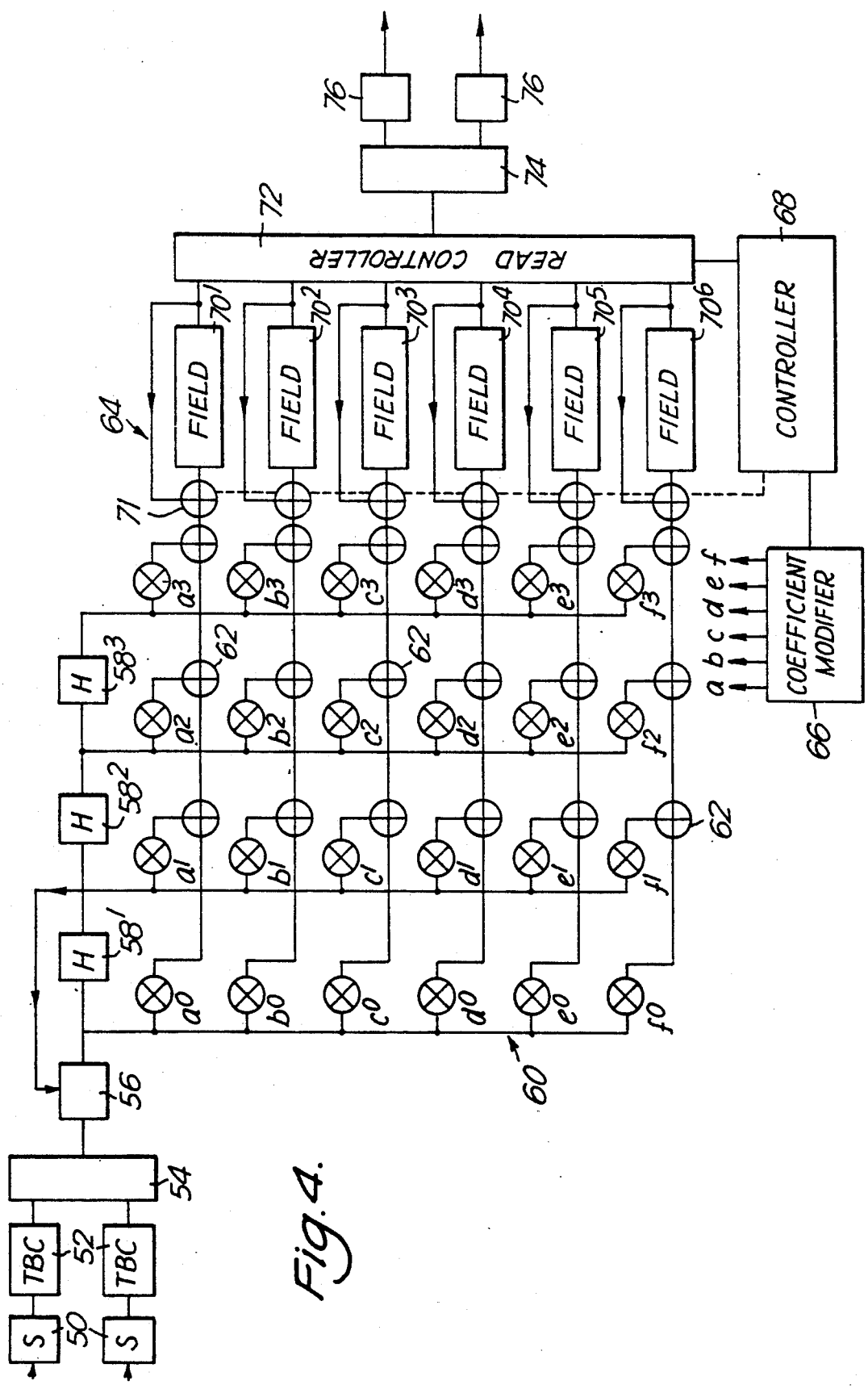
FIG. 4 is a block diagram illustrating a further example of a method and apparatus according to the present invention.

The arrangement produced by the addition of a simple line interpolator as shown in FIG. 3 to the arrangement of FIG. 1 will have limitations in the filter characteristic applied by the standards converter. It will be recognised that the operation of deriving an output video signal from an input video signal with differing numbers of lines per field and fields per second can be regarded as being a sampling or filtering operation conducted on the notional signal of which the digitised input video signal is regarded to be a series of samples. As is known, an aperture function of filter characteristic can be selected which determines the relative weighting to be applied to neighbouring lines and fields of the input, to produce one pixel of the output. If this amplitude function is not separable as between lines and fields, a more sophisticated form of interpolation is required. The present invention can readily provide for such interpolation as will be described with reference to FIG. 4.

The luminence and chrominance elements of an input video signal are passed through scalers 50 and time-base correctors 52 to a multiplexer 54. The resulting 8 bit signal is passed through drop-out corrector 56 to a chain of single line delays $58^1$, $58^2$ and $58^3$. The output of line delay $58^1$ is returned to the drop-out corrector 56 enabling the last line to be repeated in the event of line drop-out in a VTR originating input signal, as discussed previously.

An array 60 of multipliers is provided in six channels a to f. Multipliers $a^0$ to $f^0$ receive the undelayed input signal; multipliers $a^1$ to $f^1$ receive the one-line delayed output from delay $58^1$; multipliers $a^2$ to $f^2$ the two-line delayed signal from line delay $58^2$ and multipliers $a^3$ to $f^3$ the three-line delayed signal from delay $58^3$. The outputs from each channel of multipliers (for example $a^0$ to $a^3$) are summed in adders 62 and passed to memory 64. The coefficients for each of the multipliers within the array is set by coefficient modifier 66, in dependence upon signals received from controller 68.

The memory 64 comprises six separate field stores $70^1$ to $70^6$ which are equivalent in structure and function. Each field store takes the form of a dynamic RAM capable of holding an entire video field. An adder 71 is provided in a feed back loop for each field store so that the output of each field store can be added to the input in an accumulation mode, as will be described more fully later. The memory further comprises a read controller 72 which, in dependence upon signals from the controller 68, connects a selected one of the field stores 70 to a demultiplexer 74 which provides, via scalers 76, output luminence and chrominance signals.

The field stores 70 are operated in a cyclical manner which is unique to the present invention.

The example is taken in which field interpolation is conducted over four input fields. Considering first the writing operation, field store $70^1$ is set by read controller 72 to WRITE LOAD mode, that is to say the accumulating function of adder 71 is disabled, and the field store receives from channel a of the multiplier array picture information $L_y$, where y in the line number of the output standard. It will be seen from inspection of the multiplier array 60 that the line information $L_y$ includes information from four lines of the input video signal, thus:

$$L_y = a^0 L_{y'-2} + a^1 L_{y'-1} + a^2 L_{y'} + a^3 L_{y'+1}$$

It will be understood that there is no constant relationship between y and y' and the selection of appropriate input lines and the coefficients to be applied to those lines is governed by the aperture function, as is well known.

Simultaneously with the loading of field store $70^1$, field stores $70^2$ to $70^4$ are written in WRITE ACC (write accumulate) mode. Thus, for example, the new line information $L_y$ in field store $70^2$ will be given by:

$$L_y = L_y^0 + b^0 L_{y'-2} + b^1 L_{y'-1} + b^2 L_{y'} + b^3 L_{y'+1}$$

Where $L_y^0$ relates to the previous field or fields.

In this way there is loaded into field store $70^2$ information corresponding to the sum of two line interpolations performed for consecutive input fields, the weighting between the two input fields being governed generally by the ratios of the coefficient $a^0$ to $a^3$ to the coefficients $b^0$ to $b^3$. Simultaneously, information relating to three input fields is being loaded into field store $70^3$, and information relating to four input fields into field store $70^4$.

At the commencement of the next input field, field store $70^1$ is switched to WRITE ACC(2) mode (that is to say in which information is accumulated over two input fields) whilst field store $70^2$ is switched from mode WRITE ACC(2) to mode WRITE ACC(3) and so on.

Over the next two input fields, the procedure is repeated so that at the completion of four fields, field store $70^1$ holds a frame in the output standard in which each line is derived from four lines of the video input (with a relative weighting determined by ratios such as $a^0: a^1: a^2: a^3$) and four fields of the input (with a relative weighting determined by ratios such as $a^0: b^0: c^0: d^0$). The relative weighting of fields is determined by the aperture function as disclosed above. This may be regarded as a bell function, with the amplitude of the function at any point in the y,t plane (y being line number and t time) determining the weighting to be applied. The function need not be separable as between y and t. That is to say the relative line weighting can vary from field to field. The location of the bell function is determined by the location of the desired line and field in the output standard and the described coefficients perform a multiplication of the bell function and the input signal.

The information in field store $70^1$ can then be read out through read controller 72 at an output standard timing rate to produce the output video signal. In view of the fact that field store $70^1$ will not be required in the write operation for approximately two input field lengths, conversion from 50 to 60 fields per second can be achieved with no timing conflict.

It would be understood that as field store $70^1$ is passing (at input field timing rates) through modes WRITE LOAD-WRITE ACC(2) WRITE ACC(3) and WRITE ACC(4), other field stores are passing through the same modes in different phases. Any field store which has completed the sequence WRITE LOAD to WRITE ACC(4) will remain in REFRESH mode until an instruction is received from the read controller to pass to READ mode. This will occur at output field timing rates. The number of field stores ensures that there is always a field store set for entry into READ mode.

The additional channel e, not referred to in the above description, permits field interpolation to be conducted over five input fields where, as with 525/60 to 625/50, the input and output field rates permit. In normal operation it provides further assurance that a field store will always be capable of entering READ mode.

It should be stressed that although the channels a to f have been described as operating in different modes, all channels cycle through all modes as the conversion proceeds.

Those skilled in the art will recognize that the NTSC standard is not precisely 60 fields per second, so that there is no fixed phase relationship between input and output fields. This presents no difficulties since reading and writing of the field stores can be conducted entirely independently. It is necessary to identify a start point for the read operation and this can be done for example by noting the line number in the input signal associated with a particular point in the scan.

In those cases where in 525/625 conversion the same four input lines are required (with differing coefficients) to construct two output lines, use in made of the buffer storage inherent in the time base correctors 52.

The present invention provides a standards convertor which provides combined field and line interpolation in a manner believed to be close to theoretically optimum performance. The fact that interpolation is carried out in the input stage means that information is available for a variety of video signal processing steps, of which drop-out correction is an example. Since no field store is ever written and read simultaneously (that is to say within the same field) memory management is straightforward. Moreover, this arrangement of field stores lends itself readily to efficient implementation on currently available high density storage devices.

Whilst this description has been largely confined to standards conversion, it will be recognised that the same equipment can be used for synchronization and noise reduction. Indeed, the described arrangement of field stores which are written or updated simultaneously with information from the same input field and read cyclically after an appropriate accumulation interval, is believed to have application in a broad range of video signal processing techniques.

I claim:

1. A method of processing an input video signal utilising at least n field stores, comprising writing information simultaneously to n−1 of the field stores and reading the stores cyclically to produce an output video signal, characterized in that differently weighted information corresponding with each field of the input signal is written simultaneously to the respective n−1 field stores and in that information is accumulated over a different m fields of the input video signal in the respective n field stores, where n>m>1.

2. A method according to claim 1, wherein information written to each of the field stores and corresponding with one line of the output video signal, is derived from a plurality of lines of the input video signal.

3. A method according to claim 1 or claim 2, wherein the information written to the respective n−1 field stores varies between said field stores as by a multiplier coefficient.

4. A method according to claim 3, wherein the multiplier coefficient varies over the accumulation sequence of m fields of the input video signal.

5. Video signal processing apparatus comprising input means for receiving an input video signal; field store arrangement comprising at least n field stores; store writing means adapted during each field of the input video signal to write information relating to said field to n−1 of the field stores; and store reading means adapted asynchronously with said store writing means to read said field stores cyclically, with no field store being simultaneously written to and read, characterised in that the store writing means is adapted to write differently weighted information relating to each said field of the input video signal to the respective n−1 field stores, the arrangement being such that information in each field store is accumulated over a different m fields of the input video signal, where n>m>1.

6. Apparatus according to claim 5, wherein said store writing means is adapted to write to said respective n−1 field stores information differing between said field stores as by a multiplier coefficient.

7. Apparatus according to claim 6, wherein said multiplier coefficient varies over the accumulation sequence of m fields.

8. Apparatus according to any one of claims 5 to 7, in the form of a television standards converter.

9. Apparatus according to any one of claims 5 to 7, further comprising at least two line stores connected with said input means, said store writing means being adapted to write to said field stores information corresponding with one line of the output video signal and derived from a plurality of lines of the input video signal.

10. Apparatus according to claim 9, in the form of a television standards converter.

11. Video store means comprising at least n field stores adapted for the simultaneous writing of information from a single input field to n−1 of the field stores and adapted for cyclical reading asynchronously with the writing, no field store being simultaneously written to and read, characterised in that the field stores are adapted for the simultaneous writing of differently weighted information from a single input field to said n−1 field stores with the field stores continuously accumulating information over a plurality of input fields.

12. A television standards conversion process utilising at least n field stores, comprising writing information corresponding with each field of the input signal simultaneously to n−1 of the field stores; accumulating information in said field stores over m fields of the input video signal where n>m>1 and reading the field stores cyclically to produce an output video signal.

13. A television standards converter comprising input means for receiving an input video signal; a field store arrangement comprising at least n field stores; store writing means adapted during each field of the input video signal to write information relating to said field to n−1 of said field stores, such that information in each said field store is accumulated over m fields of the input video signal where n>m>1; and store reading means adapted asynchronously with said store writing means to read said field stores cyclically, with no field store being simultaneously written to and read.

* * * * *